US012694876B2

(12) United States Patent
Chae et al.

(10) Patent No.: US 12,694,876 B2
(45) Date of Patent: Jul. 28, 2026

(54) CONCIERGE DEVICE FOR PROVIDING ARTIFICIAL INTELLIGENCE CONCIERGE SERVICE, AND A CONTROL METHOD FOR SAME DEVICE

(71) Applicant: LG ELECTRONICS INC., Seoul (KR)

(72) Inventors: Jonghoon Chae, Seoul (KR); Hyoungyoon Kim, Seoul (KR); Donghoon Yi, Seoul (KR); Daeyeon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 18/701,368

(22) PCT Filed: Aug. 9, 2022

(86) PCT No.: PCT/KR2022/011815
§ 371 (c)(1),
(2) Date: Apr. 15, 2024

(87) PCT Pub. No.: WO2023/063552
PCT Pub. Date: Apr. 20, 2023

(65) Prior Publication Data
US 2024/0412730 A1 Dec. 12, 2024

(30) Foreign Application Priority Data
Oct. 15, 2021 (KR) ........................ 10-2021-0137676

(51) Int. Cl.
*G10L 15/22* (2006.01)
*G10L 13/02* (2013.01)
(Continued)

(52) U.S. Cl.
CPC .............. *G10L 15/22* (2013.01); *G10L 13/02* (2013.01); *G10L 15/18* (2013.01); *G10L 15/30* (2013.01)

(58) Field of Classification Search
USPC ...................................... 704/1–504
See application file for complete search history.

(56) References Cited

U.S. PATENT DOCUMENTS

| | | | |
|---|---|---|---|
| 11,367,435 B2 * | 6/2022 | Poltorak | ............... G06F 16/435 |
| 12,008,988 B2 * | 6/2024 | Lim | ......................... G10L 15/24 |

(Continued)

FOREIGN PATENT DOCUMENTS

| | | |
|---|---|---|
| KR | 1020160130739 | 11/2016 |
| KR | 1020210012528 | 2/2021 |

(Continued)

OTHER PUBLICATIONS

Korean Intellectual Property Office Application No. 10-2021-0137676, Notice of Allowance dated Aug. 7, 2024, 6 pages.

*Primary Examiner* — Marcus T Riley
(74) *Attorney, Agent, or Firm* — LEE, HONG, DEGERMAN, KANG & WAIMEY

(57) ABSTRACT

A concierge device comprises: a camera for obtaining image information of an utterer located within a valid distance from the concierge device; a microphone for receiving speech information of the utterer; a speaker for outputting response information corresponding to the speech information of the utterer; a memory for storing a plurality of corpora; an artificial intelligence unit that includes a natural language processing component to recognize the speech information of the utterer through natural language understanding and generate a natural language sentence including the response information corresponding to the recognized speech information; and a control unit that detects at least one of the plurality of corpora, which matches features of the (Continued)

utterer detected through the image information of the utterer, controls the artificial intelligence unit to generate the natural language sentence on the basis of the detected corpus.

16 Claims, 8 Drawing Sheets

(51) Int. Cl.
  *G10L 15/18*          (2013.01)
  *G10L 15/30*          (2013.01)

(56)                    References Cited

U.S. PATENT DOCUMENTS

| 12,050,464 | B2 * | 7/2024 | Lee | B25J 11/008 |
| 2017/0221484 | A1 * | 8/2017 | Poltorak | G10L 15/142 |
| 2020/0035244 | A1 * | 1/2020 | Kim | G06N 3/008 |
| 2021/0064019 | A1 * | 3/2021 | Choi | G05D 1/0016 |
| 2021/0072750 | A1 * | 3/2021 | Lee | B25J 11/008 |
| 2021/0110824 | A1 * | 4/2021 | Lim | G10L 15/18 |
| 2024/0412730 | A1 * | 12/2024 | Chae | G10L 13/02 |

FOREIGN PATENT DOCUMENTS

| KR | 1020210074632 | 6/2021 | |
| KR | 102295807 | 8/2021 | |
| WO | WO-2023063552 A1 * | 4/2023 | G06F 3/167 |

* cited by examiner (a)

(d)                                                        (c)

(a)

(b)

CONCIERGE DEVICE FOR PROVIDING ARTIFICIAL INTELLIGENCE CONCIERGE SERVICE, AND A CONTROL METHOD FOR SAME DEVICE

CROSS-REFERENCE TO RELATED APPLICATION(S)

This application is the National Stage filing under 35 U.S.C. 371 of International Application No PCT/KR2022/011815, filed on Aug. 9, 2022, which claims the benefit of earlier filing date and right of priority to Korean Application No. 10-2021-0137676, filed on Oct. 15, 2021, the contents of which are all incorporated by reference herein in their entirety.

TECHNICAL FIELD

The present disclosure relates to a device that provides concierge services, and more particularly to a concierge device to which an artificial intelligence (AI) algorithm is applied.

BACKGROUND ART

In general, concierge services refer to services that respond to the needs of customers for their convenience. Since these concierge services must be able to respond to the needs of the customers, typically, the persons in charge of the concierge services are permanently stationed, and the services are provided depending on the persons.

Meanwhile, due to the development of artificial intelligence (AI) technologies, methods of providing concierge services through devices such as robots, to which the AI technologies are applied, have emerged. This has led to the introduction of, concierge services of retrieving information required by customers, when the customers request for requirements with speech (or voice) information, and providing the retrieved information in the form (visual information or auditory information) to be perceivable by the customers have appeared.

However, such concierge device has a simple configuration that converts speech information entered by a customer into a text and retrieves information corresponding to the converted text. The concierge service can be provided when a customer directly designates necessary information and requests for the information using voice, when a customer accesses the concierge service to directly request for information, or the like. This causes a problem that the concierge service can be passively provided only by a customer's direct request.

Moreover, in the case of such a typical concierge device, there is a problem that it is not user-friendly as it has a mechanical structure for providing information in response to a request. Therefore, people who are not accustomed to using devices, for example, the elderly or children, can have difficulty in using concierge devices, which reduces the usability of the concierge devices and requires separate manpower to provide concierge services.

DISCLOSURE OF INVENTION

Technical Problem

The present disclosure is directed to solving the above-mentioned problems and other disadvantages. An aspect of the present disclosure is to provide a concierge device that is capable of providing not only information, which is not designated directly by a customer, but also information metaphorically requested by the customer, through natural language analysis and natural language understanding, and a method for controlling the concierge device.

Another aspect of the present disclosure is to provide a concierge device with improved user friendliness by identifying an utterer and providing sentences and images according to the identified utterer, and a method for controlling the concierge device.

Solution to Problem

To achieve these and other advantages and in accordance with the purpose of the present disclosure, as embodied and broadly described herein, there is provided a concierge device that includes a camera that acquires image information related to a utterer located within a preset effective distance from the concierge device, a microphone that receives speech information from the utterer, a speaker that outputs response information corresponding to the utterer's speech information, a memory that stores a plurality of corpora that meet different conditions, an artificial intelligence unit that includes a natural language processing (NLP) component to recognize the utterer's speech information through natural language understanding and generate a natural language sentence including the response information corresponding to the recognized speech information, and a controller that controls the artificial intelligence unit to detect at least one, matching at least one of feature information related to the utterer detected through the utterer's image information, among the plurality of corpora, and to generate the natural language sentence based on the detected at least one corpus, and controls the speaker to output speech information corresponding to the natural language sentence generated in the artificial intelligence unit as the response information.

In one embodiment, the feature information related to the utterer can include at least one of a gender and an age of the utterer, and the controller can detect any one corpus, which matches the at least one of the gender and the age of the utterer, from the plurality of corpora.

In one embodiment, the controller can determine whether a conversation with the utterer has ended, and when the conversation with the utterer has ended, store information related to the detected at least one corpus, the feature information related to the utterer, the utterer's speech information recognized through the natural language understanding, and the response information output as the response to the speech information, in the memory as conversation information related to the utterer.

In one embodiment, the controller can delete the conversation information related to the utterer stored in the memory when a preset time elapses.

In one embodiment, the controller can initialize the preset time when feature information identified from an utterer close to the concierge device matches the feature information included in the conversation information before the preset time elapses.

In one embodiment, when speech information is received again from the utterer having the feature information, which matches the feature information included in the conversation information, before the preset time elapses, the controller can determine a meaning corresponding to the re-received speech information by further reflecting the utterer's speech information and response information included in the conversation information to a recognition result according to natural language understanding for the re-received speech information.

In one embodiment, when the speech information is received again from the utterer having the feature information, which matches the feature information included in the conversation information' before the preset time elapses, the controller can update the conversation information to further include the re-received speech information and the response information according to the re-received speech information.

In one embodiment, the concierge device can further include a display, and the controller can control the display to output an image of a preset avatar.

In one embodiment, the controller can detect an eye level of the utterer from the feature information detected from the utterer, and control the display to change a posture of the displayed avatar to match the detected eye level.

In one embodiment, the controller can output an avatar with a different gender or age according to the feature information detected from the utterer.

In one embodiment, the controller can determine an emotional state of the avatar based on at least one of an emotional state of the utterer determined based on the image information of the utterer and the response information corresponding to the recognized speech information of the utterer, and control the display to output an avatar having one of a plurality of expressions corresponding to the determined emotional state.

In one embodiment, the controller can determine the emotional state of the avatar by giving priority to the response information corresponding to the utterer's speech information over the utterer's emotional state.

In one embodiment, when there is no utterer within a preset effective distance, the controller can retrieve people around the concierge device, identify as a help requester a person who has been found a certain number of times or more within a preset time among the people around the concierge device, and output a greeting asking whether the identified help requester needs help.

In one embodiment, the concierge device can further include a moving part that moves a body of the concierge device, and when the help requester is identified, the controller can control the moving unit such that the concierge device approaches within the preset effective distance from the help requester, and output the greeting when the help requester enters within the preset effective distance.

In one embodiment, the concierge device can further include a communication unit that performs a communication connection with a server including the natural language processing component. The server can recognize the speech information received from the concierge device through the natural language understanding, retrieve information corresponding to a result of the recognition, generate a natural language sentence including information corresponding to the result of the recognition based on at least one of a plurality of corpora, matching different conditions, based on the utterer's feature information received from the concierge device, and transmit the natural language sentence generated in response to the received speech information to the concierge device, and the controller can transmit the feature information detected from the utterer and the speech information received from the utterer to the server, and control the communication unit to receive the natural language sentence from the server.

In one embodiment, the concierge device can further include a display. The server can further transmit information related to a gesture or posture of a preset avatar using tag information related to the natural language sentence, and the controller can control the display to output the avatar taking the gesture or posture according to the tag information.

To achieve these and other advantages and in accordance with the purpose of the present disclosure, as embodied and broadly described herein, there is provided a method for controlling a concierge device, including: identifying a utterer located within a preset effective distance from the concierge device and detecting feature information from the identified utterer, selecting at least one of a plurality of corpora, which meet different conditions, based on at least one of the detected feature information related to the utterer, recognizing speech information received from the utterer through natural language understanding and retrieving information requested by the utterer according to a result of the recognition, generating a natural language sentence based on the at least one selected corpus, by using the retrieved information, and outputting the generated natural language sentence as speech information.

Advantageous Effects of Invention

Hereinafter, effects of a concierge device and a method for controlling the same according to the present disclosure will be described.

According to at least one of embodiments of the present disclosure, a concierge device can identify speech information input from a customer through natural language analysis and understanding, to estimate information metaphorically requested by the customer and output a natural language response including the estimated information, thereby providing a more active concierge device to the customer.

According to at least one of embodiments of the present disclosure, a concierge device can identify an utterer and respond to the utterer by generating a suitable natural language sentence from a semantic representation group selected according to the identified utterer, thereby providing a concierge service that the utterer can feel more friendly.

According to at least one of embodiments of the present disclosure, a concierge device can identify an utterer and output an avatar that takes a gesture according to the physical features of the identified utterer or matches the eye level of the identified utterer, thereby providing a concierge device that the utterer can feel more friendly.

MODE FOR THE INVENTION

It should be noted that the technical terms used in this specification are only used to describe specific embodiments and are not intended to limit the present disclosure. A singular representation used herein can include a plural representation unless it represents a definitely different meaning from the context. In general, a suffix such as "module" and "unit" can be used to refer to elements or components. Use of such a suffix herein is merely intended to facilitate description of the specification, and the suffix itself is not intended to give any special meaning or function.

In this application, the terms "comprising" and "including" should not be construed to necessarily include all of the elements or steps disclosed herein, and should be construed not to include some of the elements or steps thereof, or should be construed to further include additional elements or steps.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. It should also be understood that each of embodiments described below and combinations of those embodiments are all changes, equivalents, or substitutes which can belong to the idea and scope of the present disclosure.

Figure 1:
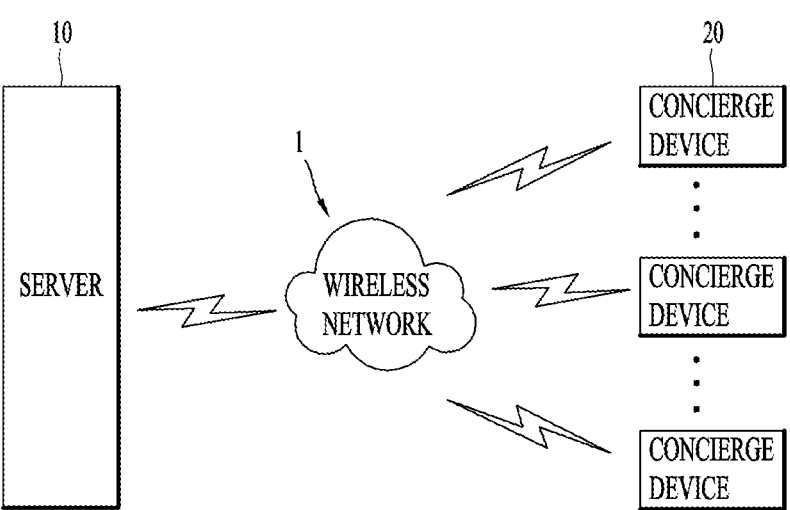
FIG. 1 is a conceptual view illustrating a concierge service system including a concierge device in accordance with one embodiment of the present disclosure.

FIG. 1 is a conceptual view illustrating a concierge service system 1 including a concierge device in accordance with one embodiment of the present disclosure.

Referring to FIG. 1, a concierge service system 1 according to an embodiment of the present disclosure can be configured such that at least one concierge device 20 is connected to a server 10 through a wireless network.

Here, the concierge device 20 can be a device that directly provides concierge services to customers. As an example, the concierge device 20 can be in the form of a robot that is movable, or can be a display device, such as a digital signage device, which is fixedly installed in a specific location. Additionally, the concierge device 20 can be an unmanned terminal such as a kiosk, and can include a display for displaying visual information and an interface, such as a touch pad, which is sensitive to touches. In this case, the display can be implemented integrally with a touch sensor, forming a touch screen that displays visual information and simultaneously provides an input interface for the displayed visual information.

Meanwhile, the display of the concierge device 20 can be a three-dimensional (3D) image display that outputs two-dimensional (2D) or 3D images. As an example, the display can include a holographic display or a floating display, and can be configured to output visual information as 3D image information output through the holographic display or floating display.

Meanwhile, the concierge device 20 is a device that communicates directly with a customer, that is, an utterer, and can collect various information related to the utterer for communication with the utterer. For example, the concierge device 20 can collect image (or video) information regarding the utterer or speech (audio or voice) information detected from the utterer. The concierge device 20 can identify the utterer's state based on the collected utterer related information, and output a sentence suitable for the utterer's request depending on the identified utterer's state or output image information reflecting the collected utterer's state. Moreover, through natural language processing based on the utterer's state, the concierge device 20 can output information requested by the utterer along with a perfect sentence in natural language (i.e., natural language sentence) and a natural avatar image matching the natural language sentence, thereby providing a more user-friendly and advanced concierge service.

To provide such advanced concierge services, the concierge device 20 can operate based on an artificial intelligence (AI) algorithm. For example, the concierge device 20 can detect feature information, such as the utterer's physical features, from the collected image information of the utterer, and analyze the utterer's age, gender, emotional state, etc. In addition, the concierge device 20 can generate a natural language sentence including information requested by the utterer based on results analyzed using the detected feature information, and output the generated natural language sentence as a response to the utterer's request. The concierge device 20 can output an image of an avatar suitable for the utterer based on the feature information detected from the utterer and the information requested by the utterer.

In order to provide such advanced concierge services, each concierge device 20 can be connected to the server 10. In this case, the server 10 can provide information, which is required for providing a concierge device, to the concierge device 20 based on information collected from the concierge device 20, for example, information collected from the utterer.

As an example, the server 10 can provide various information related to a specific location where the concierge device 20 is installed. In this case, the server 10 can retrieve information requested by each connected concierge device 20 and provide the retrieved information to each concierge device 20. That is, the server 10 can function as a database that stores various information related to the specific location.

In this case, an artificial intelligence (AI) unit (artificial intelligence processor) disposed in each concierge device 20 can independently identify the utterer's state based on the feature information detected from the utterer, and determine a semantic representation group, namely, a corpus, which is suitable for the utterer, according to the identification result. In addition, the concierge device 20 can analyze and understand speech information (or voice information) input from the utterer through a natural language processing (NLP) component disposed in the artificial intelligence unit, identify the information requested by the utterer based on the analysis result, and request for the identified information from the server 10. The concierge device 20 can generate a natural language sentence, which includes information provided in response to the request, through the natural language processing, and output the generated natural language sentence and the involved image information, for example, the image of an avatar.

In this case, each concierge device 20 can create a separate artificial intelligence agent, which can have a different learning level depending on the number of times that the concierge device 20 provides a concierge service to the utterer.

To the contrary, each concierge device 20 can be, of course, operated by a single artificial intelligence agent. In this case, the single artificial intelligence agent can be disposed in the server 10. Each concierge device 20 can transmit feature information detected from an utterer to the server 10. The artificial intelligence agent disposed in the server 10 can identify an utterer corresponding to each concierge device 20, and determine an appropriate semantic representation group for each concierge device 20 according to the identified utterer.

When speech information is input from an utterer through a specific concierge device, the NLP component disposed in the server 10 can analyze and understand the speech information and identify information requested by the utterer. Additionally, the NLP component can retrieve information corresponding to the identified information and generate a natural language sentence including the retrieved information. The NLP component can provide the generated natural language sentence to the specific concierge device. Then, the specific concierge device that has received the natural language sentence can output the received natural language sentence in response to the utterer's request.

Here, the artificial intelligence agent of the server 10 can estimate the utterer's situation by reflecting the utterer's information detected from the specific concierge device and the response to the utterer's request. The artificial intelligence agent of the server 10 can provide information for controlling the specific concierge device, to output image information suitable for the estimated utterer's situation.

As an example, the artificial intelligence agent can transmit information related to an avatar's gesture or posture to the specific concierge device in the form of tag information included in the generated natural language sentence. Then, the specific concierge device can cause the avatar displayed on the display to make a specific gesture or take a specific posture based on the tag information received along with the natural language sentence, received from the server 10.

In this case, the artificial intelligence unit disposed in each concierge device 20 can only perform additional functions that do not overlap the functions of the artificial intelligence agent disposed in the server 10. For example, the artificial intelligence unit disposed in each concierge device 20 can determine an utterer's emotional state based on image information collected from the utterer, and provide the determined emotional state, as one of collected specific information related to the utterer, to the artificial intelligence agent of the server. Alternatively, the artificial intelligence unit disposed in each concierge device 20 can provide the result of determining the utterer's gender or age identified based on the image information collected from the utterer to the artificial intelligence agent of the server 10, as one of collected feature information of the utterer.

Alternatively, unlike the case described above, the server 10 and the concierge device 20 can individually process functions for providing concierge services. For example, the server 10 can include a natural language understanding (NLU) component for understanding the natural language, among natural language processing (NLP) components for natural language processing. In this case, the server 10 can understand the utterer's speech information input from a specific concierge device through the NLU component, and determine information requested by the utterer through the specific concierge device according to the result of the understanding. And the server 10 can return the determination result to the specific concierge device. That is, among the functions of the concierge device 20 according to an embodiment of the present disclosure, the functions of understanding the natural language and retrieving information accordingly can be entrusted to the server 10.

When information corresponding to the utterer's request is received from the server 10, the artificial intelligence unit of the concierge device 20 can generate a natural language sentence including the received information. To this end, the artificial intelligence unit of the concierge device 20 can include a natural language generation (NLG) component for providing the natural language among the NLP components, and determine at least one corpus, suitable for the utterer, currently detected through the NLG component. Then, the artificial intelligence unit of the concierge device 20 can generate a natural language sentence, which includes information provided from the server 10, based on the determined at least one corpus and output the generated natural language sentence to the utterer which has input the speech information.

In this case, the artificial intelligence unit of each concierge device 20 can determine an avatar to be output or an avatar's gesture or posture based on at least one of the detected feature information of the utterer, the information provided from the server 10, and the generated natural language sentence. Then, the artificial intelligence unit of the concierge device 20 can output the determined avatar, or can output image information including the avatar which takes the determined gesture or posture.

In this case, the artificial intelligence agent can be in a form where one artificial intelligence agent is disposed in the server 10 and the server 10 is driven by the artificial intelligence agent disposed in the server 10. Alternatively, the artificial intelligence agent can be in a form where each concierge device 20 is equipped with a different artificial intelligence agent, and the artificial intelligence agent of each concierge device 20 shares the function (of the function of the natural language understanding (NLU) component) of the server 10. Alternatively, the artificial intelligence agent can be in a form where the server 10 and each concierge device 20 are individually equipped with an artificial intelligence agent, and the server 10 and the concierge device 20 collaborate with each other to provide concierge services.

Meanwhile, for convenience of explanation, the following description will be given under assumption that the concierge device 20 providing concierge services while directly facing the utterer includes an artificial intelligence unit, to which an artificial intelligence algorithm is applied, and which understands (NLU) and analyzes speech information input from the utterer to identify information requested by the utterer, and generates and provides a natural language sentence including the identified information. However, as described above, the concierge service system 1 according to an embodiment of the present disclosure can be implemented in various forms, so of course, the present disclosure is not limited to the following description.

That is, the artificial intelligence unit of the concierge device 20 to be described below can be implemented in the server 10, and when implemented in the server 10, a plurality of concierge devices can be controlled by a single artificial intelligence agent disposed in the server 10. Alternatively, it should be noted that part of the artificial intelligence unit of the concierge device 20 described below can be implemented in the server 10 and another part can be implemented in the concierge device 20. In this case, it should be noted that the NLU component constituting the NLP components can be implemented in the server 10, and the NLG component can be implemented in the concierge device 20.

Figure 2:
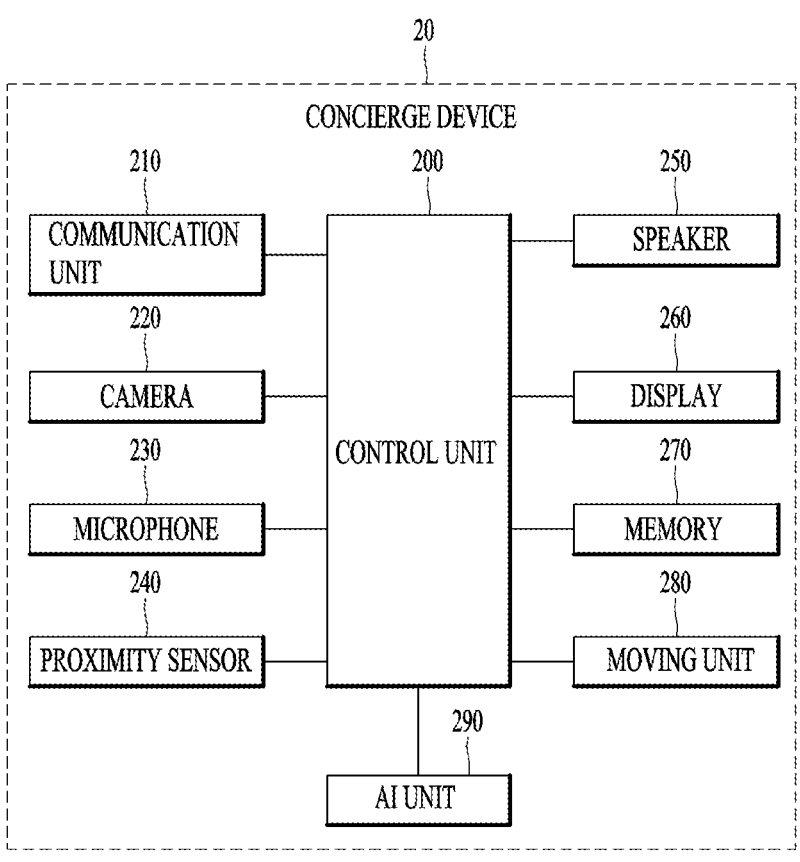
FIG. 2 is a block diagram illustrating a structure of a concierge device in accordance with an embodiment of the present disclosure.

FIG. 2 is a block diagram illustrating the structure of a concierge device 20 in accordance with an embodiment of the present disclosure.

Referring to FIG. 2, the concierge device 20 according to an embodiment of the present disclosure can include a controller (processor) 200, a communication unit 210 connected to the controller 200, a camera 220, a microphone 230, a proximity sensor 240, a speaker 250, a display 260, and a memory 270.

The concierge device 20 can also include a moving unit 280 which includes at least one moving element, such as a wheel or caterpillar, for moving the main body of the concierge device 20 under the control of the controller 200, and at least one power element (e.g., motor) for driving the moving element. The concierge device 20 can also include an artificial intelligence unit 290 to which a preset artificial intelligence algorithm is applied.

The components illustrated in FIG. 2 are not essential for implementing the concierge device 20, and thus the concierge device 200 described herein can have more or fewer components than those listed above.

First, the communication unit 210 can include one or more modules that enable wireless communications with the server 100 or other devices around the concierge device 20 using a preset communication technology. As an example, the communication unit 210 can include at least one of a wireless Internet module configured to transmit and receive wireless signals in a communication network according to wireless LAN (WLAN), wireless-fidelity (Wi-Fi), long term evolution (LTE), and 5G communication technologies, and a short-range communication module supporting short-range wireless communication such as Bluetooth™, infrared data association (IrDA), or Wi-Fi.

Additionally, the camera 220 and the microphone 230 can each collect video (image) information and speech (audio or voice) information related to an utterer within a certain distance from the concierge device 20. In this case, the camera 220 can include one image sensor or a plurality of image sensors to process an image frame such as a still image or video obtained through the image sensor. And the processed image frame can be stored in the memory 270.

Additionally, the microphone 230 can process external acoustic signals into electrical voice data. The processed voice data can be used in various ways depending on concierge services that can be provided by the concierge device 20. Meanwhile, various noise removal algorithms can be implemented in the microphone 230 to remove noise generated in the process of receiving external acoustic signals.

Additionally, the microphone 230 can be designed with a beamforming structure having directivity to further improve the reception rate of acoustic information in a specific direction. In this case, the specific direction can be toward the front surface of the concierge device 20, and the front surface of the concierge device 20 can be determined depending on a direction in which the display 260 of the concierge device 20 is oriented or a direction in which the image of an avatar output to the display 260 is oriented.

Meanwhile, the concierge device 20 can include at least one proximity sensor 240 for sensing people or objects located around the concierge device 20. The proximity sensor 240 can be a sensor that detects a person or object located within a certain distance from the concierge device 20 by measuring distances between the concierge device 20 and persons or objects located around the concierge device 20. For example, the proximity sensor 240 can be a distance sensor such as an ultrasonic sensor, an infrared sensor, or a laser sensor.

Meanwhile, the speaker 250 can output various audio data under the control of the controller 200. As an example, the speaker 250, under the control of the controller 200, can generate various natural language sentences, generated in the artificial intelligence unit 290, such as a greeting, a question asking whether help is needed, or a response to an utterer's request, and output the generated sentences through a human voice. For this purpose, the controller 200 can use text-to-speech (TTS).

The display 260 can display (output) various information (hereinafter, referred to as image information) that the concierge device 20 provides for concierge services. For example, the display 260 can display information according to the utterer's request, execution screen information related to a function executed in response to the utterer's request, or user interface (UI) and graphic user interface (GUI) information according to displayed information.

Additionally, the display 260 can display an avatar image of an artificial intelligence agent. In this case, the avatar can have various appearances, and the avatar which is taking a specific posture or making a specific gesture can be displayed through the display 260 under the control of the controller 200.

The display 260 can also be configured as a three-dimensional (3D) display that displays a 3D image. As an example, the display 260 can output the image information as a hologram through a projection method. Alternatively, the display 260 can be provided in the form of a floating display to output a 2D or 3D floating image.

Meanwhile, the artificial intelligence unit 290 can play a role of processing information based on an artificial intelligence technology, and can include one or more modules of performing at least one of information learning, information inference, information perception, and natural language processing.

The artificial intelligence unit 290 can perform at least one of learning, inferring, and processing of a huge amount of information (big data), such as information stored within the concierge device 20, environmental information around the concierge device 20, information stored in an external storage medium which can perform communication), and the like, using a machine learning technology.

Here, learning can be achieved through the machine learning technology. The machine learning technology is a technology of collecting and learning big data, and determining and predicting information based on the learned information, by using at least one algorithm. Learning information is an operation of identifying the features, rules, and judgment criteria of information, quantifying the relationship between information, and predicting new data using quantified patterns.

The algorithm used by the machine learning technology can be an algorithm based on statistics, and examples of the algorithm can include decision tree that uses a tree structure as a predictive model, an artificial neural network that mimics the structure and function of neural networks in living things, genetic programming based on a biological evolution algorithm, clustering that distributes an observed example into subsets called clusters, a Monte Carlo method that calculates function values as probabilities through randomly extracted random numbers, etc.

As one field of the machine learning technology, a deep learning technology is a technology of performing at least one learning, judging, and processing of information using an artificial neural network algorithm. The artificial neural network can have a structure that connects layers and transmits data between the layers. In the deep learning technology, a huge amount of information can be learned through an artificial neural network using a graphic processing unit (GPU) optimized for parallel computation.

Meanwhile, the learned artificial intelligence unit 290 (hereinafter, referred to as the artificial intelligence unit 290) can collect various feature information related to an utterer based on image information collected through the camera 220. For example, the artificial intelligence unit 290 can determine the utterer's gender and age from image information based on pre-learned results and collect the determined information as the utterer's feature information. In addition, the utterer's current emotional state can be determined based on the utterer's facial expression, voice, speech speed, breathing sound, etc. Additionally, the utterer's situation can be estimated based on environmental information around the utterer, that is, other people located around the utterer or belongings the utterer has. The determined emotional state or the estimated situation of the utterer can be collected as feature information related to the utterer.

Meanwhile, the artificial intelligence unit 290 can include an NLP component for natural language processing. The artificial intelligence unit 290 can understand and analyze speech information collected from the utterer through the NLP component, and determine information requested by the utterer using voice. Then, the artificial intelligence unit 290 can generate a natural language sentence, which is suitable for the utterer, based on a semantic representation group according to at least one of the detected feature information of the utterer, by using the determined information.

As an example, the artificial intelligence unit 290 can determine that an utterer is a child, based on the utterer's feature information collected through image information. Then, the artificial intelligence unit 290 can select a semantic representation group corresponding to the age of the utterer, that is, the child. The artificial intelligence unit 290 can identify information requested by the utterer based on a natural language analysis for speech information input from the utterer, and generate a natural language sentence, which includes the information requested by the utterer, using words included in the currently selected semantic representation group, namely, corpus. Therefore, the artificial intelligence unit 290 can generate a natural language sentence using terms that the child as the utterer can understand.

In this way, the artificial intelligence unit 290 of the concierge device 20 according to an embodiment of the present disclosure can select a semantic representation group based on feature information detected from an utterer, so that a different natural language sentence can be generated depending on an utterer even if the same information is requested. For example, in case where an utterer requests route guidance information for a location that is about ten steps to the right from a current location, when the utterer is a child as described above, the artificial intelligence unit 290 can generate a natural language sentence made up of terms that the child can understand, for example, "Take ten steps to the right" or "Take ten steps towards the hand you eat with." On the other hand, when an utterer is an elderly person who is familiar with using Chinese characters, the artificial intelligence unit 290 can generate a sentence made up of terms that are more familiar to the elderly, such as "Just go about ten steps to the right." The artificial intelligence unit 290 can transmit the generated natural language sentence to the controller 200.

Meanwhile, the artificial intelligence unit 290 can transmit a control command to the controller 200 to control other components of the concierge device 20 or execute a specific operation, based on the learned information. The controller 200 can control the concierge device 20 based on the control command to output information according to the utterer's feature information detected by the artificial intelligence unit 290, for example, the natural language sentence generated in the artificial intelligence unit 290, and an avatar image according to the utterer's features.

In the present disclosure, the artificial intelligence unit 290 and the controller 200 can be understood as the same component. In this case, the functions performed by the controller 200 described herein can be expressed as being performed by the artificial intelligence unit 290, and the controller 200 can be named the artificial intelligence unit 290, or, conversely, the artificial intelligence unit 290 can also be called the controller 200.

To the contrary, in the present disclosure, the artificial intelligence unit 290 and the controller 200 can be understood as separate components. In this case, the artificial intelligence unit 290 and the controller 200 can perform various controls on the concierge device 20 through data exchange with each other. The controller 200 can perform at least one of the functions executable in the concierge device 20 or control at least one of the components of the concierge device 20, based on the results derived from the artificial intelligence unit 290. Furthermore, the artificial intelligence unit 290 can operate under the control of the controller 200.

The artificial intelligence unit 290 can include at least some of the NLP components. More specifically, the artificial intelligence unit 290 can include both the NLU component and the NLG component, which constitute the NLP components, or can include only the NLG component that determines a semantic representation group and generates a natural language sentence from the determined semantic representation group. In this case, the NLU component that recognizes speech information received from an utterer through natural language understanding and analysis can be implemented in the server 10.

Also, the memory 270 can store data to support various functions of the concierge device 20. The memory 270 can store a plurality of application programs (or applications) run in the concierge device 20, data for the operation of the concierge device 20, instructions, and data for the operation of the artificial intelligence unit 290 (e.g., at least one algorithm information for machine learning or the NLP component or the NLU or NLG component).

The memory 270 can also include information related to an utterer's state and situation that can be estimated based on at least one piece of feature information collected from the utterer. On the basis of such data, the artificial intelligence unit 290 can determine (identify) various features of the utterer, for example, the utterer's gender, age, and emotional state, through the collected feature information regarding the utterer. The data can be generated through learning.

On the other hand, the memory 270 can store the utterer's feature information detected under the control of the controller 200 for a preset time. The memory 270 can store conversation generated in response to the utterer, that is, speech information received from the utterer, understood and analyzed results of the speech information, and information (hereinafter, referred to as conversation information) related to natural language sentences generated by the concierge device 20 in response to the speech information. When a conversation with the same utterer is made before the preset time elapses under the control of the controller 200, the conversation information stored in relation to the utterer can be provided to the controller 200, in response to the request of the controller 200. In this way, when the conversation with the same utterer occurs before the preset time elapses, the conversation information stored in relation to the utterer can be updated, and the preset time can also be initialized. However, when the preset time elapses, the conversation information can be deleted.

Meanwhile, the controller 200 can control the overall operation of the concierge device 20. The controller 200 can control each connected component to provide a concierge service requested by an utterer.

For example, the controller 200 can control the communication unit 210 to perform wireless communication with the server 10 to transmit feature information collected from an utterer, and receive determination results for the utterer, in response to the transmitted feature information. The controller 200 can generate a natural language sentence based on the determination results, and control the speaker 250 to output the generated natural language sentence.

Furthermore, the controller 200 can select the image of an avatar suitable for the utterer based on the received determination results and control the display 260 to output the selected image of the avatar. Alternatively, the controller 200 can control the display 260 to output the image of an avatar taking a posture suitable for the utterer.

As an example, the controller 200 can detect the utterer's eye level as feature information detected from the utterer. The controller 200 can output the image of an avatar suitable for the utterer according to the detected eye level. For example, when an utterer is a child, the controller 200 can control the display 260 to output an avatar with the appearance of a child or an avatar with a lowered eye level by squatting or bending its back.

Alternatively, the controller 200 can extract information related to the utterer's features based on the collected image information and speech information, and control the artificial intelligence unit 290 to estimate the utterer's features, state, or situation. The controller 200 can also decide a semantic representation group according to the estimated utterer's features, state, or situation, and perform natural language understanding and analysis of the speech information received from the utterer, based on the determined semantic representation group. Furthermore, the controller 200 can identify information that the utterer requests according to results of the natural language understanding and analysis, and generate a natural language sentence including the identified information.

That is, the concierge device 20 according to an embodiment of the present disclosure can perform natural language processing by itself according to the utterer's feature information and generate a natural language sentence according to the results of the natural language processing. In this case, the server 10 can only serve as a database through which the concierge device 20 can retrieve information.

Figure 3:
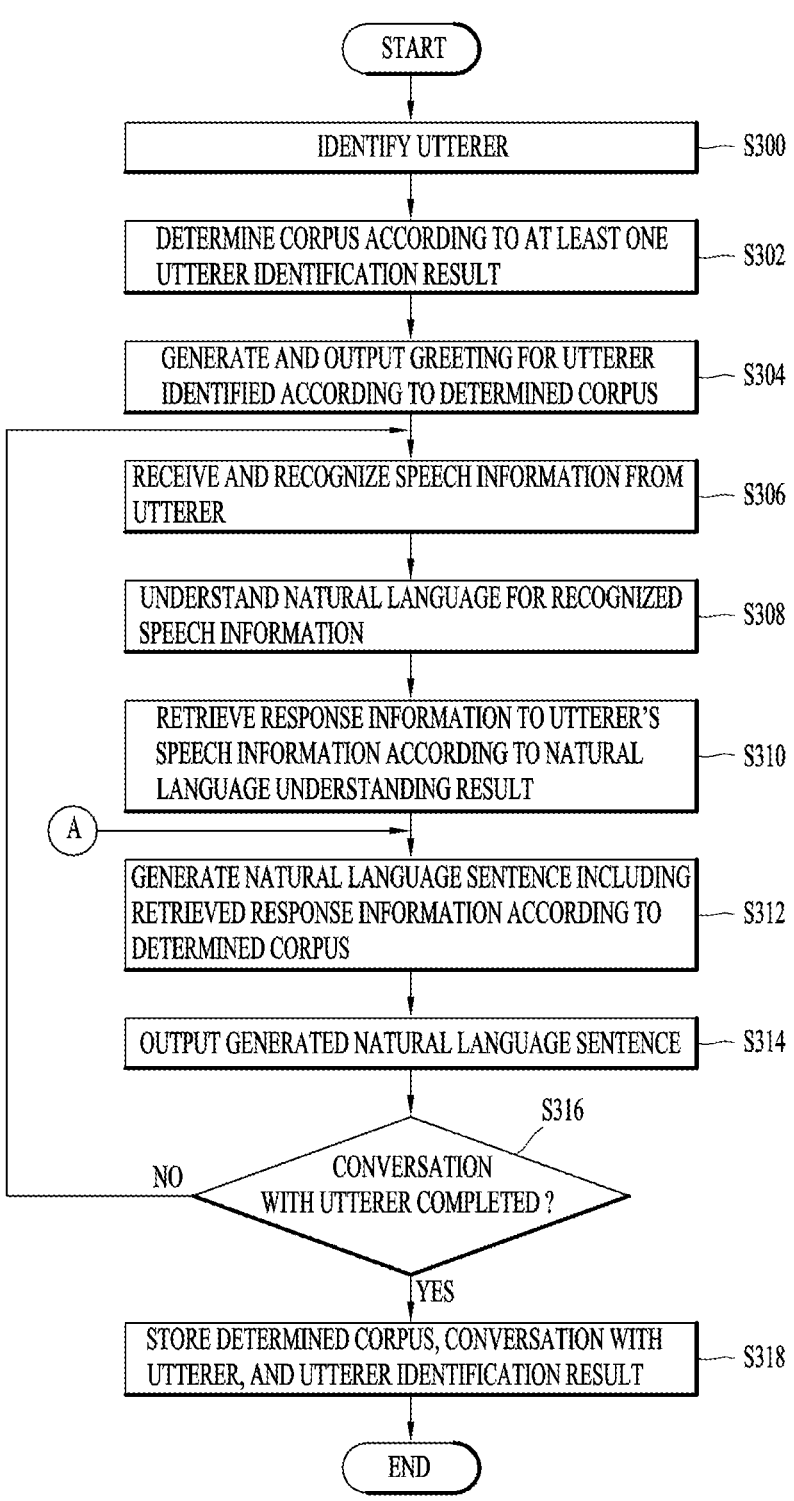
FIG. 3 is a flowchart illustrating an operation process for providing a concierge service in the concierge device according to an embodiment of the present disclosure.

FIG. 3 is a flowchart illustrating an operation process for providing a concierge service in the concierge device 20 according to an embodiment of the present disclosure.

Referring to FIG. 3, the controller 200 of the concierge device 20 according to an embodiment of the present disclosure can first sense image information regarding an utterer who approaches within a certain distance, that is, within an effective distance, and determine the utterer's features from the sensed image information (S300). As an example, the controller 200 can detect from the image information the number of utterers, the clothes worn by the utterer, the utterer's hairstyle, the utterer's height, the utterer's face, the utterer's look, etc. The controller 200 can extract at least one feature information related to the utterer from the detected features. For example, the controller 200 can identify the utterer's gender or age, the utterer's emotional state, the utterer's situation, etc. from the detected features. The controller 200 can store the identification results as the utterer's feature information.

Meanwhile, when the utterer is identified in step S300, the controller 200 can determine at least one semantic representation group, that is, a corpus, suitable for the utterer based on at least one of the identified utterer's feature information (S302). The controller 200 can generate a greeting for the utterer and output the generated greeting according to the determined at least one corpus and the utterer's identification results (S304).

Here, a corpus can refer to a set of language samples (utterance samples or word samples) with a high frequency of use or high distribution under preset conditions based on a probability or statistical technique. The preset conditions can be at least one of the utterer's feature information identified in step S300. Therefore, when it is identified as the utterer's features that the utterer is in the ages of 'teens to twenties' and the utterer's gender is 'female,' the controller 200 can select a set (corpus) of language samples that girls in the ages of five to teens frequently and widely use.

Here, the language samples in the selected corpus can be preferentially selected over other texts which are not selected as a corpus. In other words, if one word among words with the same meaning but different form is included in a corpus and the other words are not included in the corpus, the word included in the corpus can be selected preferentially over the other words that are not in the corpus. Therefore, even if words have the same meaning, a word 'right' can be selected more preferentially than a word 'right-side.'

The controller 200 can then determine whether there is speech information input from the utterer in response to the greeting output in step S304. When there is no speech information being received, the controller 200 can determine that the utterer does not request for a concierge service. However, when speech information is input from the utterer in response to the greeting, the controller 200 can determine that the utterer requests for a concierge service, and receive and recognize the input speech information (S306). The controller 200 can perform natural language understanding and analysis on the recognized speech information (S308).

Here, the natural language understanding and analysis can be an analysis process for converting speech information input in natural language into available information. To this end, the controller 200 can convert the speech information input as a result of the perception in step S306 into text, and perform, for the converted text, various analyses, such as morphological analysis, lexical analysis, syntactic analysis, semantic analysis, ambiguity processing, and discourse synthesis, pragmatic analysis, etc. in step S308.

These analyses in step S308 can be performed in the artificial intelligence component, namely, the NLU component, to which analytics for natural language understanding are applied. Therefore, when the artificial intelligence unit 290 of the concierge device 20 includes the NLU component, the concierge device 20 can perform the natural language understanding and analysis process by itself according to step S308. However, when the artificial intelligence unit 290 of the concierge device 20 does not include the NLU component, the natural understanding and analysis process according to step S308 can be carried out through the NLU component of the artificial intelligence agent disposed in the server 10.

Meanwhile, when the natural language understanding and analysis is completed in step S308, the controller 200 can determine information requested by the utterer through voice based on the results of analyzing the utterer's speech information. The controller 200 can then perform a retrieval based on the determined information (S310). In this case, when the concierge device 20 itself performs the natural language understanding and analysis, the controller 200 can transmit the determined information to the server 10 to perform a retrieval. On the other hand, when the natural language understanding and analysis is carried out by the server 10, information corresponding to the determined information can be retrieved by the server 10. The information retrieved according to the retrieval results can be received from the server 10.

When the retrieval is completed in step S310, the controller 200 can generate a natural language sentence including the retrieved information, that is, response information. In this case, to generate the natural language sentence, the controller 200 can refer to the corpus determined in step S302. That is, the controller 200 can generate the natural language sentence including the response information based on the corpus determined in step S302 (S312). The controller 200 can output the generated natural language sentence, in response to the speech information of step S306 (S314).

Meanwhile, when the natural language sentence is output as the response in step S314, the controller 200 can determine whether the conversation with the utterer identified in step S302 has ended (S316). For example, when speech information is received again from the utterer after outputting the response information, the controller 200 can determine that the conversation with the utterer has not ended. When it is determined that the conversation with the utterer has not ended, the process can go back to step S306, to receive speech information from the utterer and recognize the received speech information. The process of steps S308 through S314 can be performed again.

Meanwhile, when it is determined in step S316 that the conversation with the utterer has not ended, the controller 200 can perform the process of identifying the utterer again. When the utterer has not changed as the result of the utterer identification, the process of steps S306 through S314 can be performed again. However, when the utterer has changed as the result of the utterer identification, the process can go to step S300 to identify an utterer and a process of outputting a response generated as a natural language sentence in step S314 can be performed. Therefore, during a conversation with an utterer, if a conversation is conducted by another utterer, for example, a company of an utterer which has identified earlier, a corpus according to the another utterer can be selected, and a natural language sentence according to the selected corpus can be generated as a response and can be output.

Meanwhile, the controller 200 can determine that the conversation with the utterer has ended when speech information is not input for a preset time after the output of the response information, when the utterer leaves out of the available distance of the concierge device 20, or a preset farewell greeting (e.g., see you again, goodbye, etc.) is received, according to the determination result of step S316. In this case, in response to the preset farewell greeting being received, the controller 200 can generate and output a response greeting. In this case, of course, the corpus set in step S302 can be used.

When it is determined that the conversation with the utterer has ended in step S316, the controller 200 can store conversation information with the utterer that has been exchanged up to now, that is, speech information input from the utterer, and the response information output in relation to the speech information. Additionally, the controller 200 can also store information related to the corpus determined in step S302 and the utterer's feature information identified in step S300 (S318).

In this case, the controller 200 can determine whether a preset time has elapsed since the information was stored in step S318, and can delete those information stored in step S318 when the preset time has elapsed. That is, the controller 200 can maintain the stored state of the information stored in step S318 only for the preset time, unless the preset time is updated or initialized.

Meanwhile, according to the above description, it has been explained that the concierge device 20 according to an embodiment of the present disclosure can output the image of an avatar suitable for an utterer based on feature information detected from the utterer.

Figure 4:
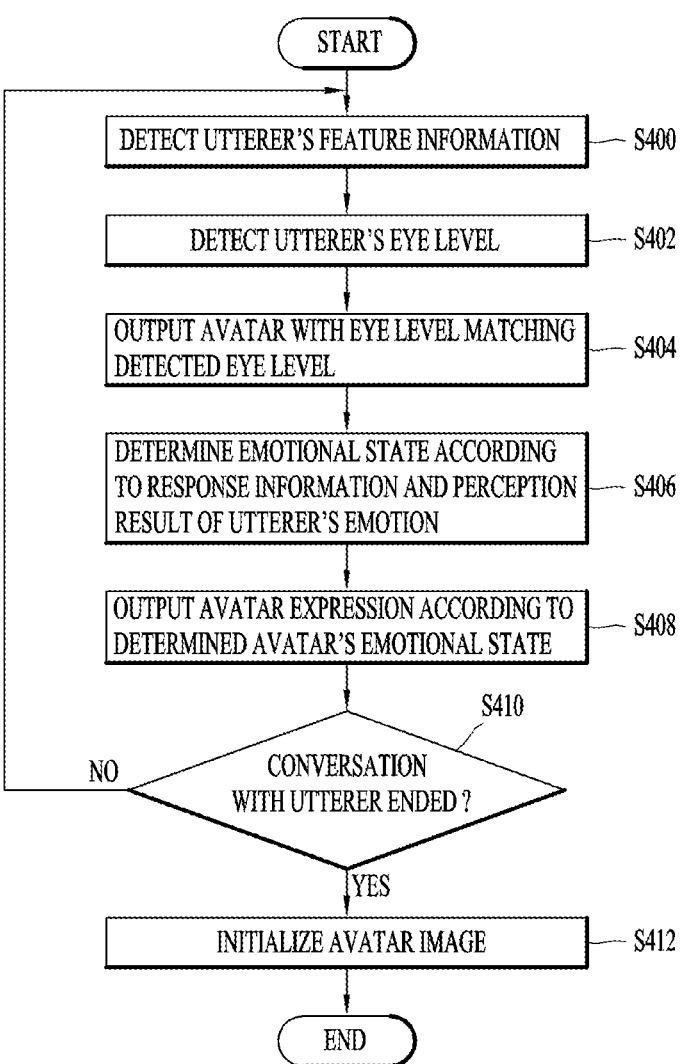
FIG. 4 is a flowchart illustrating an operation process for outputting an avatar according to feature information related to an utterer in the concierge device according to an embodiment of the present disclosure.

FIG. 4 is a flowchart illustrating an operation process for outputting the image of an avatar according to feature information related to an utterer in the concierge device 20 according to an embodiment of the present disclosure.

Referring to FIG. 4, the concierge device 20 according to an embodiment of the present disclosure can obtain image information and sound (or voice) information related to an utterer which approaches within an effective distance. The concierge device 20 can detect the utterer's feature information based on the acquired image information and sound information (S400).

For example, the utterer's feature information detected in step S400 can be physical features such as the utterer's gender or age. Alternatively, the utterer's feature information can be state features, such as the utterer's emotional state detected from the utterer's facial expression or gesture. Here, the step S400 can be the same as or be compatible with the utterer identification process performed in step S300 of FIG. 3. That is, a result detected according to the utterer identification in step S300 of FIG. 3 can be used in step S400, and the utterer can be identified in step S300 of FIG. 3 based on the utterer's feature information detected in step S400.

The controller 200 can detect the utterer's eye level based on the utterer's feature information detected in step S400 (S402). Here, the eye level refers to a height from the ground to the utterer's eyes, and can be detected differently depending on the utterer's age or posture. For example, if an utterer is a child, an eye level can be lower than an eye level if an utterer is an adult. Also, even in a similar age, if an utterer is in a sitting or bent posture, an eye level can be lower than that when an utterer is not in such a posture.

When the utterer's eye level is detected in step S402, the controller 200 can output the image of an avatar whose eye level is adjusted according to the detected eye level (S404). For example, when the detected eye level is lower than an eye level according to the avatar's default posture, the controller 200 can output an avatar image in a squatting posture to match the eye level, or an avatar image in a bent posture to make eye contact with the utterer (S404). In this case, the controller 200 can control the display 260 so that the avatar's eyes and face follow the face and eyes of the identified utterer. That is, when the utterer moves within an effective distance or changes a posture, the direction of the avatar's eyes and face can change according to the utterer's movement or posture change.

Meanwhile, in addition to changing the posture of the avatar in step S404, the controller 200 can output the image of the avatar whose eye level matches the eye level of the identified utterer. For example, if an utterer is a child, the controller 200 can output the image of an avatar with the appearance of a child. Alternatively, when an utterer is an adult, the controller 200 can output the image of an avatar with the appearance of an adult, thereby outputting the image of the avatar synchronized with the detected utterer.

When the avatar or the avatar's posture to be output in step S404 is determined, the controller 200 can determine the avatar's emotional state based on at least one of the emotional state or situation detected from the utterer, and response information to the information requested by the utterer (S406).

For example, when an emotional state detected from the utterer is joy, the emotional state of the avatar can also be determined to be a joyful emotional state. On the other hand, when the utterer is crying (for example, a crying child), the emotional state of the avatar can be determined as a sad emotional state. Additionally, when the information requested by the utterer is information related to a relief facility such as a hospital, the emotional state of the avatar can be determined to indicate urgency or worry. In this case, the emotional state of the avatar can be determined by giving priority to the information requested by the utterer through voice rather than the emotional state detected from the utterer. Therefore, even if the utterer asks for information related to the location of a hospital, etc. while smiling, the controller 200 can determine the emotional state of the avatar as an emotional state indicating worry, rather than an emotional state synchronized with a smiley face.

When the emotional state of the avatar is determined in step S408, the controller 200 can output an avatar image having an expression according to any one of facial expressions corresponding to the determined emotional state (S408). In this case, a plurality of facial expressions corresponding to each emotional state can be matched to each emotional state.

Meanwhile, the controller 200 can change the facial expression of the avatar according to preset conditions. For example, the controller 200 can change the avatar's facial expression whenever response information to the utterer's speech information is output, or at preset or random time intervals. In this case, the controller 200 can randomly determine one of facial expressions corresponding to the currently determined emotional state, and in this case, the same facial expression can be determined continuously.

The controller 200 can then determine whether the conversation with the utterer has ended (S410). For example, the controller 200 can determine that the conversation with the utterer has ended when the utterer does not input speech information for more than a preset time, when the utterer moves out of an effective distance, or when a preset farewell greeting is received from the utterer. In this case, this step S410 can be the same as or compatible with step S316 of FIG. 3. That is, when a condition corresponding to the end of the conversation with the utterer is met according to the result of the determination in either step S410 or step S316, the controller 200 can determine that the conversation with the utterer has ended.

As the result of the determination in step S410, when the conversation with the utterer has not ended, the controller 200 can proceed back to step S400 to detect the utterer's feature information. Therefore, when the utterer's posture changes, the controller 200 can detect the change in the utterer's posture. Then, the process from step S402 to step S408 can be performed again.

On the other hand, when it is determined in step S410 that the conversation with the utterer has ended, the controller 200 can initialize the avatar image (S412). That is, the controller 200 can output an avatar image that takes a basic (default) posture, for example, a posture standing with a back straight, instead of the avatar image that takes a posture for adjusting an eye level according to the utterer's eye level or has adjusted to match the utterer's eye level (S412). When another utterer approaches within an effective distance, the process of FIG. 4 can be restarted.

Meanwhile, the process of FIG. 4 can be a process that begins when the conversation with the utterer begins. In this case, steps S400 to S408 can be continuously repeated unless the conversation with the utterer ends. Therefore, the posture of the avatar and the emotional state or facial expressions of the avatar can continuously change even during the conversation by reflecting changes in the utterer's posture and emotional state that change during the conversation.

Meanwhile, according to the above description, it has been mentioned that when a conversation with an utterer ends, the concierge device 20 according to an embodiment of the present disclosure can store the conversation with the utterer for a preset time, the utterer's feature information, and the information related to a determined corpus. Accordingly, when a conversation starts again with the same utterer before the preset time elapses, the concierge device 20 according to an embodiment of the present disclosure can continue a follow-up conversation based on the stored information.

Figure 5:
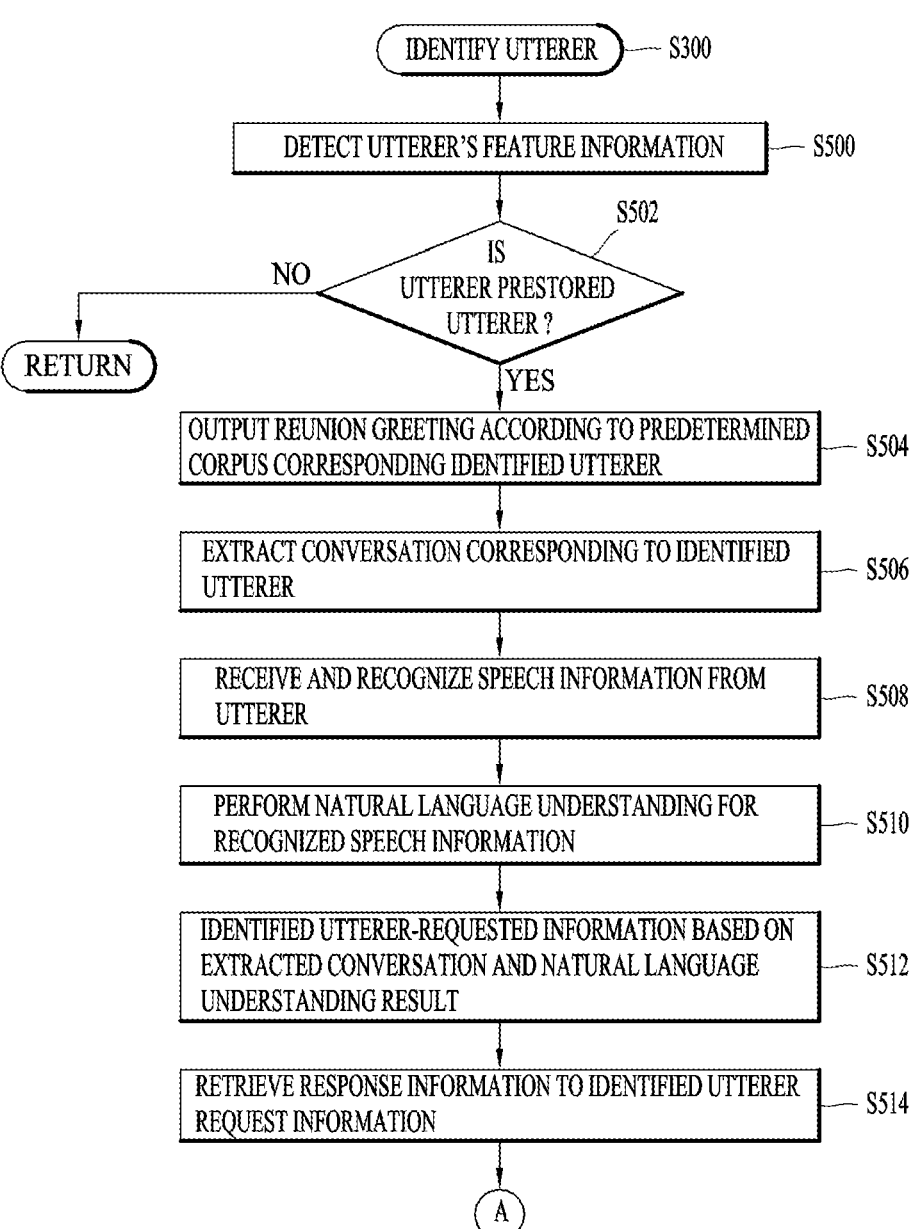
FIG. 5 is a flowchart illustrating an operation process when a follow-up conversation is conducted with the same utterer in the concierge device according to an embodiment of the present disclosure.

FIG. 5 is a flowchart illustrating an operation process when a follow-up conversation is conducted with the same utterer based on stored conversation information, in the concierge device 20 according to an embodiment of the present disclosure.

Referring to FIG. 5, when step S300 of identifying the utterer among the processes of FIG. 3 begins, the controller 200 of the concierge device 20 according to an embodiment of the present disclosure can detect the utterer's feature information based on image information and speech information collected from the utterer (S500). Additionally, the controller 200 can detect whether conversation information with an utterer having feature information corresponding to the detected utterer's feature information is stored in the memory 270 (S502).

For example, when a conversation with a specific utterer is completed through the process of FIG. 3, the controller 200 can store conversation information with the specific utterer for a preset time along with feature information detected from the specific utterer. Accordingly, the conversation with the specific utterer can be restarted when the specific utterer approaches within an effective distance of the same concierge device 20 before the preset time elapses. In this case, the controller 200 can initialize the effective duration of the pre-stored conversation information, that is, the preset time.

In this case, the controller 200 can re-set a corpus corresponding to the identified utterer, which is stored together with the stored conversation information. Then, the controller 200 can generate a greeting for a reunion using the texts of a set corpus, and output the generated reunion greeting (S504). The controller 200 can extract, from the restored conversation information, request information that has been identified from the speech information input by the utterer, and information related to a retrieval result for the speech information (S506).

The controller 200 can receive speech information from the utterer and recognize the received speech information (S508). To this end, the controller 200 can convert the speech information input from the utterer into text.

The controller 200 can perform natural language understanding for the recognized speech information (S510). Here, the natural language understanding in step S510 can include morphological analysis, lexical analysis, syntactic analysis, semantic analysis, ambiguity processing, discourse integration, and pragmatic analysis, and can be performed by the artificial intelligence unit 290 of the concierge device 20 or the artificial intelligence agent of the server 10.

The controller 200 can identify information currently requested by the utterer based on the natural language understanding result of step S510 and the extracted conversation information (S512). For example, when the utterer does not directly call a specific object but refers to it with a pronoun, the controller 200 can identify the object referred to by the utterer with the pronoun based on the prestored conversation information. That is, in case where the utterer has inquired about information related to a specific restaurant in a previous conversation, when a first conversation with the utterer is ended, the controller 200 can store the name of the specific restaurant as conversation information. Afterwards, when the utterer approaches the concierge device 20 again within a preset time, for example, 10 minutes, and asks 'When does it open?', the controller 200 can identify from the prestored conversation information that the object referred to as 'it' is the specific restaurant.

Meanwhile, when the information requested by the utterer is identified in step S512 based on the prestored conversation and the result of natural language understanding for the speech information received from the utterer in a newly-started conversation, the controller 200 can perform retrieval to acquire information corresponding to the identified utterer's request information (S514). In this case, the concierge device 20 can perform the retrieval through the server 10 and receive information corresponding to the retrieval result from the server 10.

When the information corresponding to the retrieval result is acquired, the controller 200 can proceed to step S312 of FIG. 3. Accordingly, the controller 200 can generate a natural language sentence including the retrieved information, that is, response information, and proceed to step S314 of FIG. 3 to output the generated natural language sentence. Then, the controller 200 can proceed to step S316 of FIG. 3, to determine whether the follow-up conversation with the utterer has ended, and store the conversation contents including the follow-up conversation when it ends. In this case, the preset time can be initialized due to the update of the conversation contents (the addition of follow-up conversation contents).

Meanwhile, when it is determined in step S502 that the conversation information corresponding to the utterer approaching the concierge device 20 has not been stored, the controller 200 can proceed to step S302 of FIG. 3 to determine a corpus according to the utterer's feature information detected in step S500. Then, the controller 200 can perform the process from step S304 to step S318 of FIG. 3.

Meanwhile, after the conversation information is stored in step S318 of FIG. 3, when a preset time, that is, the effective duration of the conversation information, elapses, the controller 200 can delete the conversation information. Then, the controller 200 cannot detect information corresponding to the utterer currently approaching the concierge device 20 in step S502. In this case, the controller 200 can determine that the utterer currently close to the concierge device 20 is a new utterer. Accordingly, the controller 200 can proceed to step S302 of FIG. 3, to determine a corpus according to the utterer's feature information detected in step S500, and perform the process from steps S304 to S318 of FIG. 3.

Meanwhile, the foregoing description has been given of the configuration in which the concierge device 20 according to an embodiment of the present disclosure detects a person getting close thereto and output a greeting to induce conversation.

However, on the contrary, when there is not a person located within an effective distance, the concierge device 20 according to an embodiment of the present disclosure can provide an active service of directly retrieving a person in need of help, and approaching the person to ask whether he/she needs help.

Figure 6:
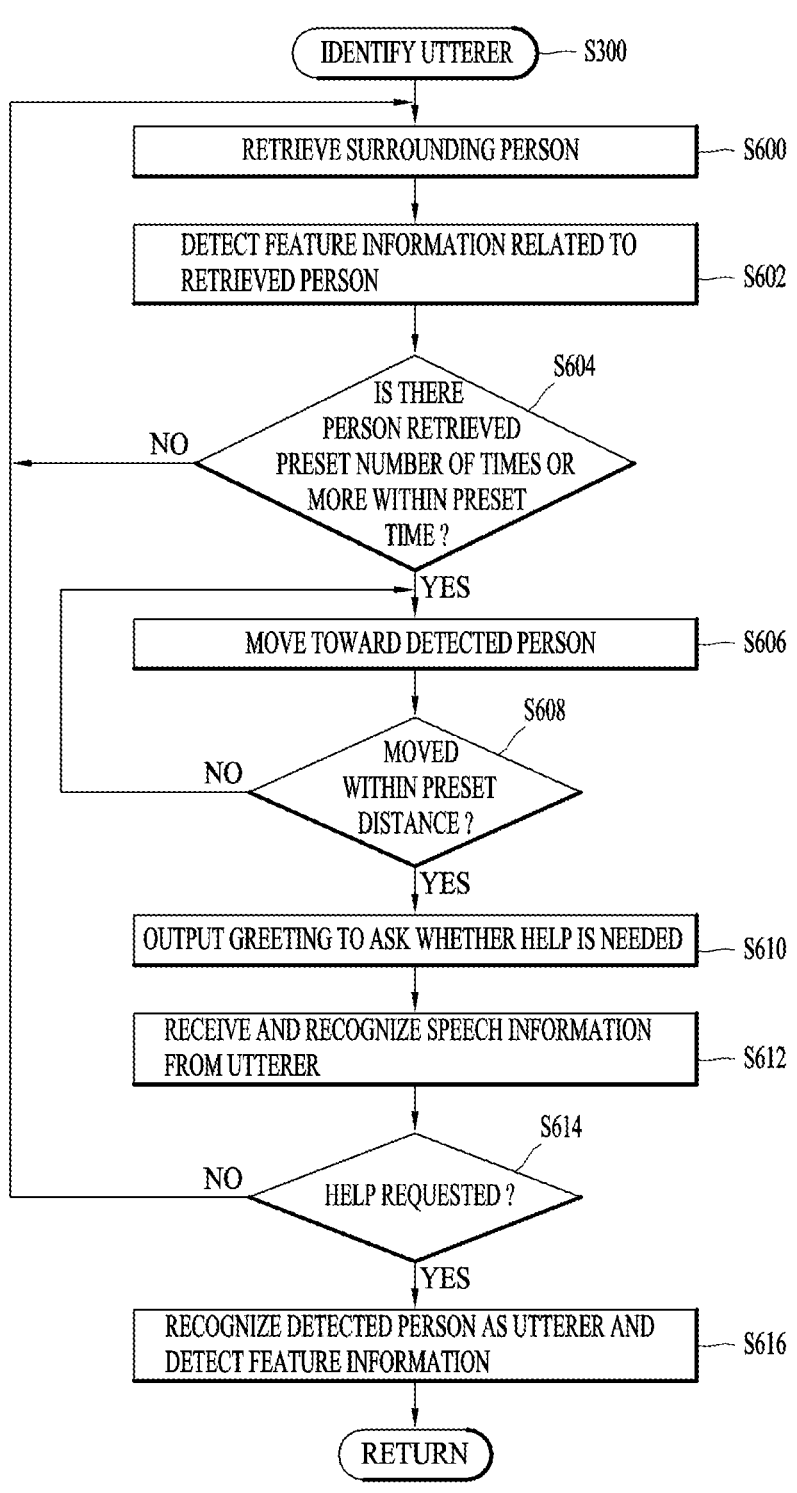
FIG. 6 is a flowchart illustrating an operation process for providing a concierge device by finding a customer in need of the concierge service, in the concierge service according to an embodiment of the present disclosure.

FIG. 6 is a flowchart illustrating an operation process in which the concierge device 20 finds a customer in need of a concierge service and actively provides the concierge service according to an embodiment of the present disclosure.

Referring to FIG. 6, the controller 200 of the concierge device 20 according to an embodiment of the present disclosure can find a person located near around the concierge device 20, regardless of an effective distance from the concierge device 20 when there is a person within the effective distance from the concierge device 20 in step S300 of identifying the utterer among those steps of FIG. 3. As an example, the controller 200 can find a person near around the concierge device 20 based on image information acquired through the camera 220.

The controller 200 can then detect brief feature information related to the person from the image of the person around the concierge device 20 (S602). Here, the brief feature information can be brief feature information, such as a height or the color or type of clothing worn (e.g., skirt, coat, etc.), which allows the person to be distinguished from other people.

Meanwhile, the controller 200 can determine whether the same person has been found around the concierge device 20 within a preset time based on the brief feature information detected in step S602 (S604). In this case, when the same person is found around the concierge device 20 a certain number of times or more within the preset time, the controller 200 can determine that the person is in need of help. Then, the controller 200 can control the moving unit 280 to move toward the person determined to need help (hereinafter, referred to as a help requester) (S606).

In this case, the controller 200 can detect whether the concierge device 20 has approached within a certain distance, for example, a preset effective distance, from the help requester. When the concierge device 20 has not approached with the certain distance from the help requester, step S606 of moving the concierge device 20 can be repeated.

In this case, when the help requester changes in location or is located far from the concierge device 20 according to the movement of the concierge device 20, the controller 200 can determine that the help requester does not need help. Then, the controller 200 can perform step S600 again to find people around the concierge device 20 again. In this case, the controller 200 can exclude the help requester from among the people found in step S600.

Meanwhile, as the result of the determination in step S608, when the concierge device 20 approaches within the preset effective distance from the help requester, the controller 200 can first output a greeting asking whether the help requester needs help (S610). And the controller 200 can receive and recognize speech information from the help requester (S612).

Here, the speech information of the help requester can be recognized according to a natural language understanding method. And, as the result of recognizing the speech information of the help requester, the controller 200 can determine whether the help requester has requested help or not (S614).

And, as the result of the determination in step S614, when the help requester has not requested help, the controller 200 can re-perform step S600 to find people around the concierge device 20 again. In this case, the controller 200 can exclude the help requester from among the people found in step S600.

On the other hand, when the determination result in step S614 is that the help requester has requested help, the controller 200 can sense image information regarding the help requester and identify the features of the help requester from the sensed image information. The controller 200 can extract at least one feature information related to the help requester from the detected features (S616). Then, based on the feature information extracted in step S616, the controller 200 can go to step S302 of FIG. 3 to determine a corpus suitable for the help requester, and perform the process from steps S304 to S318 of FIG. 3.

Meanwhile, in the above description, the process in which the concierge device 20 according to an embodiment of the present disclosure operates to provide a concierge service has been described with reference to the plurality of flowcharts. In the following description, an example of an avatar image output from the concierge device 20 according to an embodiment of the present disclosure and changes in avatar image reflecting feature information related to an identified utterer will be described in detail with reference to FIGS. 7 and 8.

Figure 7:
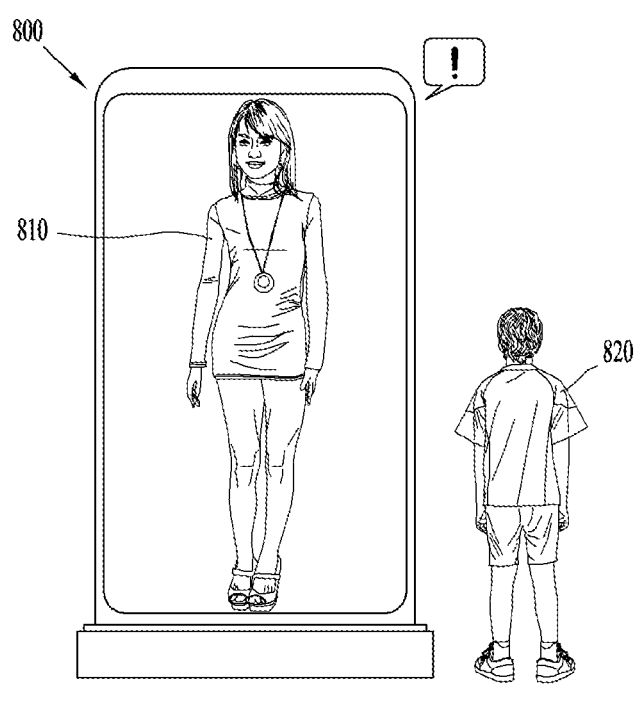
FIG. 7 is an exemplary diagram illustrating examples of displaying an avatar according to an utterer's eye level in the concierge device according to an embodiment of the present disclosure.
Figure 7:
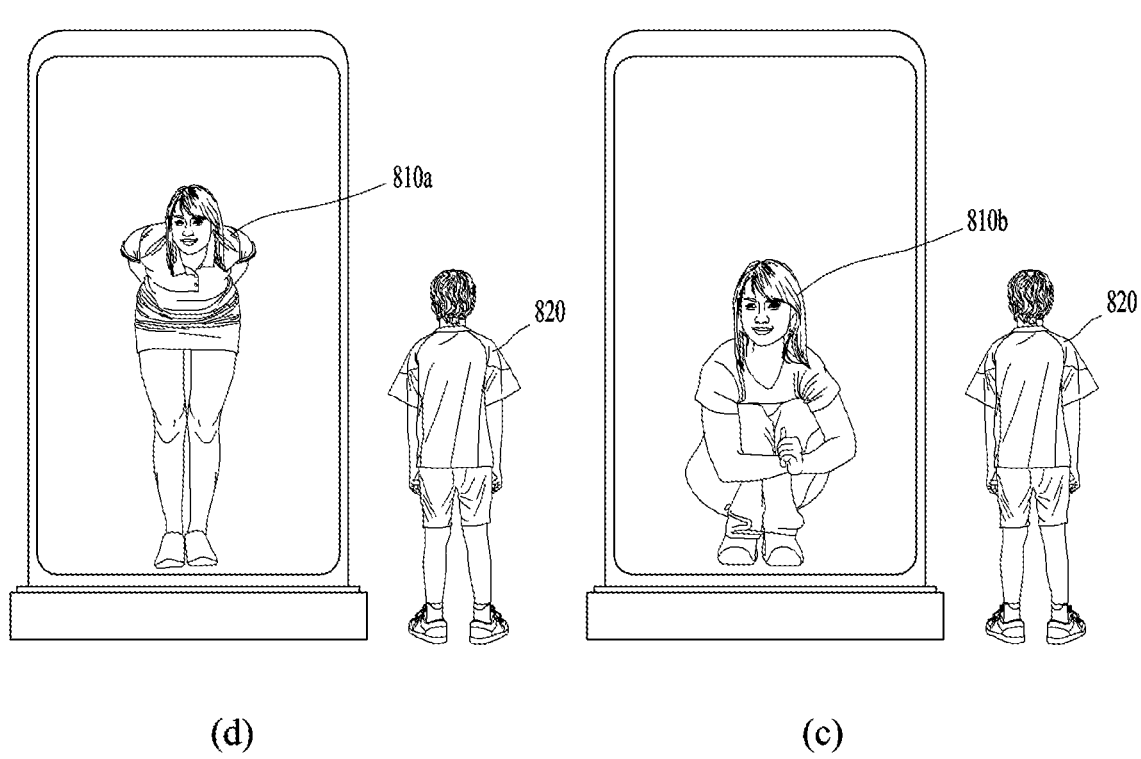

FIG. 7 is an exemplary diagram illustrating examples of displaying an avatar according to an utterer's eye level in a concierge device 20, 700 according to an embodiment of the present disclosure.

First, (a) of FIG. 7 illustrates an example of an avatar 710 in a default posture displayed on a concierge device 700 according to an embodiment of the present disclosure.

As illustrated in (a) of FIG. 7, a default avatar displayed on the concierge device 700 according to an embodiment of the present disclosure can be an adult woman, and a posture in which the woman stands with her back straight can be a default posture. In this case, when a child 720 approaches the concierge device 700, the concierge device 700 can detect this, recognize the approaching child 720 as an utterer, and detect feature information related to the child 720 recognized as the utterer.

In this case, the detected feature information can include information related to the eye level of the utterer, that is, the child 720. Then, the controller of the concierge device 700 can change the posture of the displayed avatar 710 to match the eye level of the detected utterer 720.

As an example, the controller 200 of the concierge device 700, as illustrated in (b) of FIG. 7, can output the image of an avatar 710a that takes a posture to look at the utterer 720 by bending the waist to match the eye level. Alternatively, the controller of the concierge device 700, as illustrated in (c) of FIG. 7, can output the image of an avatar 710b that takes a posture to look at the utterer 720 by squatting down to match the eye level of the utterer 720.

Figure 8:
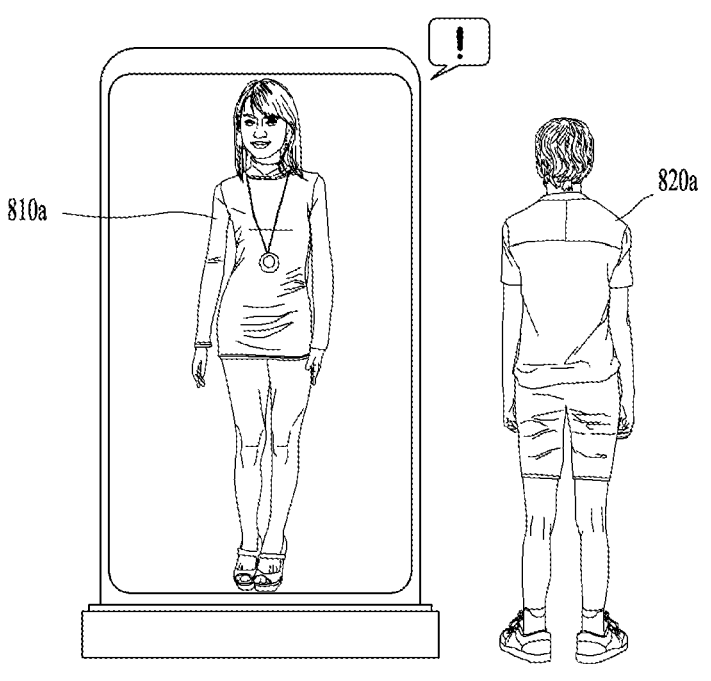
FIG. 8 is an exemplary diagram illustrating an example of outputting a different avatar according to the features of an identified utterer in the concierge device according to an embodiment of the present disclosure.
Figure 8:
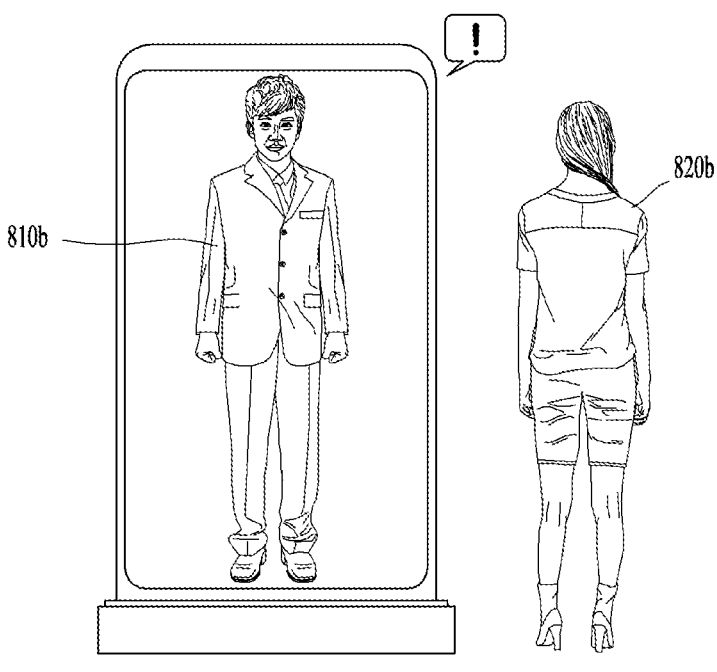

Meanwhile, the concierge device according to an embodiment of the present disclosure can output the image of a different avatar based on an identified utterer. FIG. 8 is an exemplary diagram illustrating an example of outputting a different avatar according to the features of an identified utterer in a concierge device according to an embodiment of the present disclosure.

First, referring to (a) of FIG. 8, it is assumed that a male utterer 820a is located near a concierge device 800 according to an embodiment of the present disclosure. In this case, the controller of the concierge device 800 can detect that the utterer is a male as a result of identifying the utterer 820a, and can output a female avatar 810 as illustrated in (a) of FIG. 8.

On the other hand, as illustrated in (b) of FIG. 8, when a female utterer 820b is located near the concierge device 800 according to an embodiment of the present disclosure, the controller of the concierge device 800 can detect that the utterer is a female as a result of identifying the utterer 820b. Therefore, as illustrated in (b) of FIG. 8, the controller can output a male avatar 810b.

Meanwhile, FIG. 8 has been described under assumption that a different avatar is output depending on the gender of an utterer, but of course, a different avatar can be output depending on an age. For example, when an utterer is a child, the concierge device according to an embodiment of the present disclosure can, of course, output an avatar with an appearance of a child or a cute animal.

Meanwhile, of course, the concierge device according to an embodiment of the present disclosure can output the same avatar according to an identified utterer. For example, as described in FIG. 5, if a conversation with the same utterer occurs again before a preset time elapses after the end of the conversation, the concierge device according to an embodiment of the present disclosure can output an avatar which has first been output during the conversation with the same utterer. In this case, not only the continuity of the conversation but also the continuity of the output avatar can be achieved.

Meanwhile, a concierge device according to an embodiment of the present disclosure can provide various functions for providing concierge services. For example, the concierge device can recognize an utterer's gesture based on image information detected through a camera. The concierge device can make a gesture corresponding to the recognized gesture.

As an example, the concierge device can recognize a gesture made by an utterer during a conversation and detect the meaning corresponding to the recognized gesture. In other words, when an utterer gestures thumbs up, the artificial intelligence agent of the concierge device or server can generate recommendation information related to a place mentioned by the utterer through the utterer's gesture. In the case of such gesture recognition, the avatar's eyes or face can continuously track a specific body part (e.g., hand, eye, or face) of the utterer.

Alternatively, when a child makes a specific action in front of the concierge device, the concierge device can make a gesture sympathizing with the utterer's gesture while imitating the action.

Alternatively, the concierge device can provide various services using the camera, the communication unit, and a video editing function. For example, the concierge device can receive photos taken from the utterer's mobile terminal through the communication unit, and perform a video editing function for the received photos according to the utter-er's request. Alternatively, the concierge device can output the utterer's video information on the display according to the utterer's request. In this case, the concierge device can output the image of the utterer characterized based on feature points detected from the utterer's body (e.g., face) on the display.

The present disclosure can be implemented as computer-readable codes in a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and can also be implemented in the form of a carrier wave (e.g., transmission over the Internet). Therefore, the detailed description should not be limitedly construed in all of the aspects, and should be understood to be illustrative. The scope of the present disclosure should be determined by reasonable interpretation of the appended claims, and all changes within the equivalent scope of the present disclosure are embraced by the appended claims.

The invention claimed is:

1. A concierge device comprising:
a camera configured to acquire image information related to an utterer located within a preset effective distance from the concierge device;
a microphone configured to receive speech information from the utterer;
a speaker configured to output response information corresponding to the received speech information;
a memory configured to store a plurality of corpora that meet different conditions;
an artificial intelligence processor that includes a natural language processing (NLP) component to recognize the received speech information through natural language understanding and generate a natural language sentence including the response information corresponding to the recognized received speech information; and
a processor configured to control the artificial intelligence processor to detect at least one corpus among the plurality of corpora that matches at least one feature information related to the utterer detected based on the image information, generate the natural language sentence based on the detected at least one corpus, and control the speaker to output the speech information corresponding to the natural language sentence generated by the artificial intelligence processor as the response information, and
wherein the processor is further configured to determine whether a conversation with the utterer has ended, and based on determining that the conversation with the utterer has ended, store, in the memory, information related to the detected at least one corpus, the at least one feature information related to the utterer, the recognized received speech information and the response information as conversation information related to the utterer.

2. The concierge device of claim 1, wherein the at least one feature information related to the utterer includes at least one of a gender or an age of the utterer, and
the processor is further configured to detect any one corpus from the plurality of corpora that matches the at least one of the gender or the age of the utterer.

3. The concierge device of claim 1, wherein the processor is further configured to delete the conversation information stored in the memory based on a preset time elapsing.

4. The concierge device of claim 3, wherein the processor is further configured to initialize the preset time based on feature information identified from a second utterer close to the concierge device matching the at least one feature information included in the conversation information before the preset time elapses.

5. The concierge device of claim 4, wherein based on the feature information identified from the second utterer matching the at least one feature information included in the conversation information before the preset time elapses, the processor is further configured to determine a meaning corresponding to second speech information received from the second utterer by further reflecting the recognized received speech information and the response information included in the conversation information according to natural language understanding for the second speech information.

6. The concierge device of claim 5, wherein based on the feature information identified from the second utterer matching the at least one feature information included in the conversation information before the preset time elapses, the processor is further configured to update the conversation information to further include the second speech information and the response information for the second speech information.

7. The concierge device of claim 1, further comprising a display,
wherein the processor is further configured to control the display to output an image of a preset avatar.

8. The concierge device of claim 7, wherein the processor is further configured to detect an eye level of the utterer based on the at least one feature information, and control the display to change a posture of the preset avatar to match the detected eye level.

9. The concierge device of claim 7, wherein the processor is further configured to control the display to output an avatar having a different gender or age according to the at least one feature information.

10. The concierge device of claim 7, wherein the processor is further configured to determine an emotional state of the preset avatar based on at least one of an emotional state of the utterer determined based on the image information related to the utterer or the response information corresponding to the recognized received speech information, and control the display to output an avatar to have one of a plurality of expressions corresponding to the determined emotional state.

11. The concierge device of claim 10, wherein the processor is further configured to determine the emotional state of the avatar by prioritizing the response information corresponding to the recognized received speech information over the determined emotional state.

12. The concierge device of claim 1, wherein based on no utterer being within the preset effective distance, the processor is further configured to identify people around the concierge device, identify, as a help requester, a person among the identified people who has been found at least a certain number of times within a preset time, and output a greeting asking whether the identified person needs help.

13. The concierge device of claim 12, further comprising a mover configured to move a body of the concierge device, the mover including at least one moving element including a wheel or a caterpillar, and at least one power element for driving the at least one moving element, wherein based on the person being identified, the processor is further configured to control the mover such that the concierge device approaches the identified person within the preset effective distance, and output the greeting based on the identified person entering within the preset effective distance.

14. The concierge device of claim 1, further comprising a signal transmitter and receiver configured to perform communication with a server including a NLP component, wherein the processor is further configured to transmit, to the server, the detected at least one feature information and the speech information received by the microphone, wherein the server is configured to receive the at least one feature information and the speech information, recognize the received speech information through natural language understanding, retrieve information corresponding to a result of the recognition, generate a natural language sentence including information corresponding to the result of the recognition based on at least one of a plurality of corpora matching different conditions, based on the at least one feature information received from the concierge device, and transmit, to the concierge device, the generated natural language sentence in response to the received speech information, and wherein the processor is further configured to control the signal transmitter and receiver to receive the natural language sentence from the server.

15. The concierge device of claim 14, further comprising a display, wherein the server is further configured to transmit information related to a gesture or posture of a preset avatar using tag information related to the natural language sentence generated by the server, and wherein the processor is further configured to control the display to output the preset avatar taking the gesture or the posture according to the tag information.

16. A method for controlling a concierge device, the method comprising:

identifying an utterer located within a preset effective distance from the concierge device;

detecting feature information related to the identified utterer;

selecting at least one corpus of a plurality of corpora based on at least one of the detected feature information related to the utterer, wherein the plurality of corpora meet different conditions;

recognizing speech information received from the utterer through natural language understanding;

retrieving information requested by the utterer according to a result of the recognition;

generating a natural language sentence based on the selected at least one corpus, by using the retrieved information;

outputting the generated natural language sentence as response information;

determining whether a conversation with the utterer has ended; and based on determining that the conversation with the utterer has ended, storing information related to the selected at least one corpus, the at least one of the detected feature information related to the utterer, the recognized speech information and the response information as conversation information related to the utterer.

* * * * *